L. F. GOODSPEED.
POWER TRANSMITTING MECHANISM.
APPLICATION FILED MAR. 2, 1908.
1,168,494.
Patented Jan. 18, 1916.
4 SHEETS—SHEET 1.
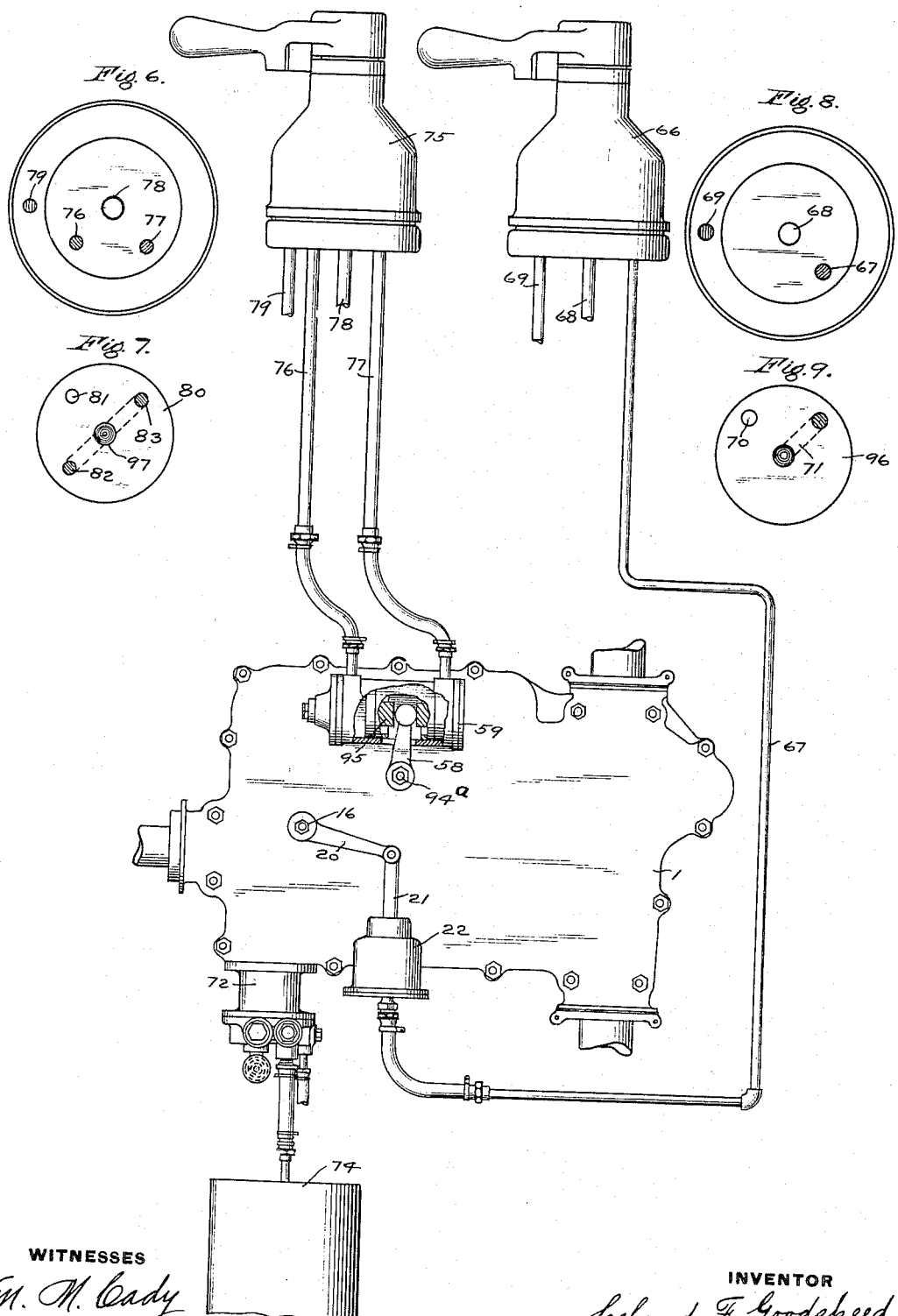
WITNESSES
INVENTOR
Leland F. Goodspeed
by E. H. Wright
Att'y.

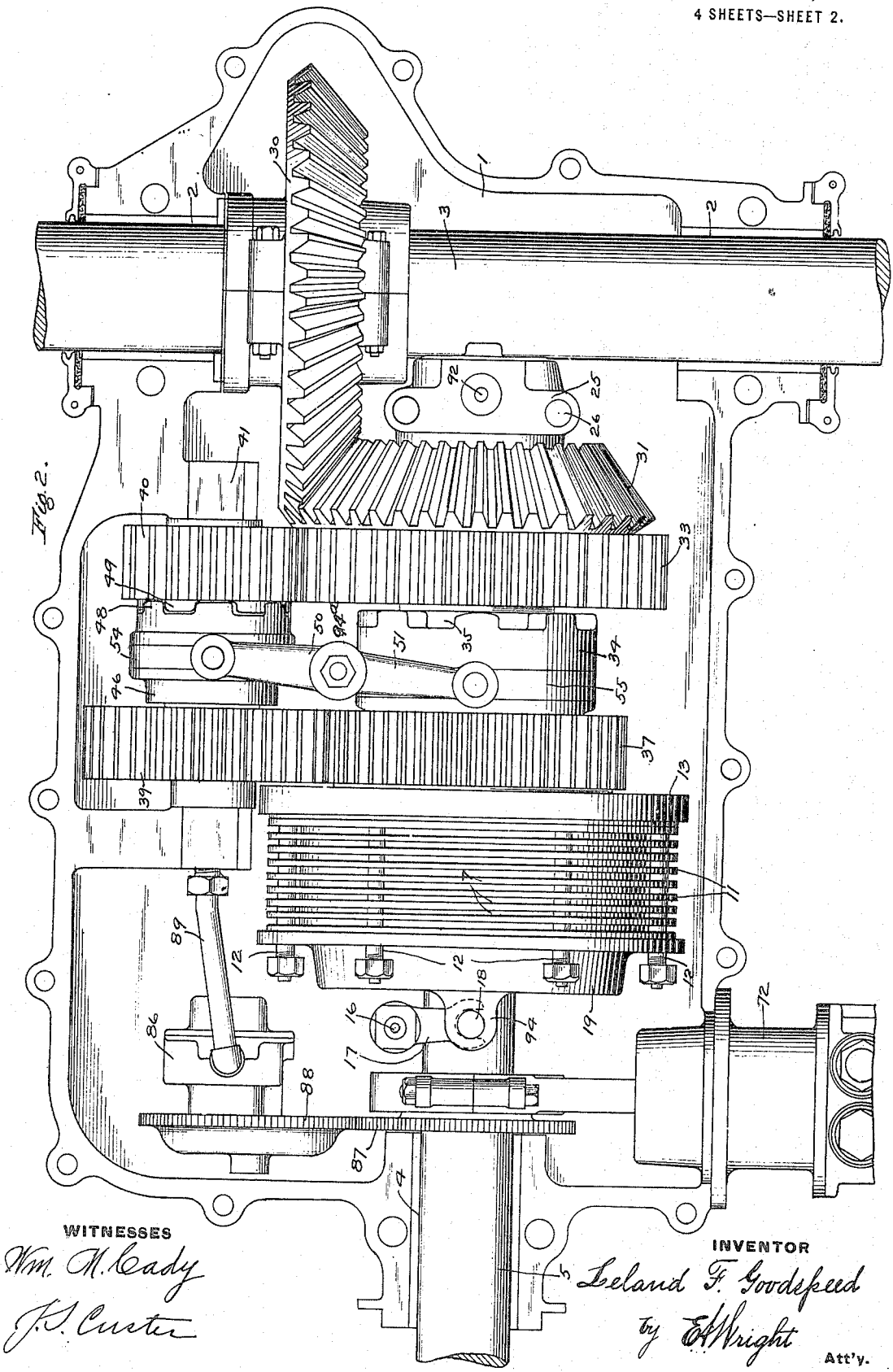

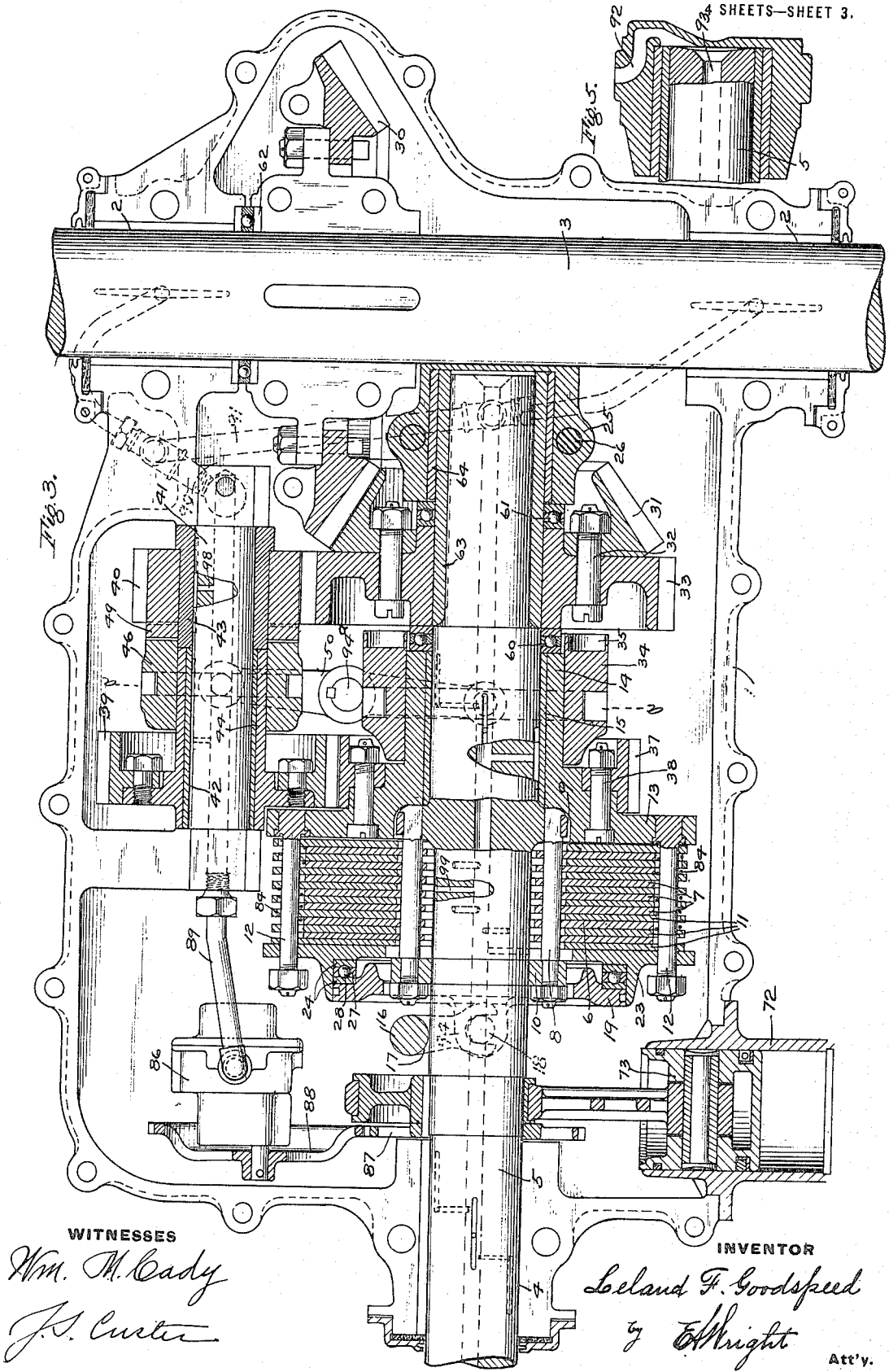

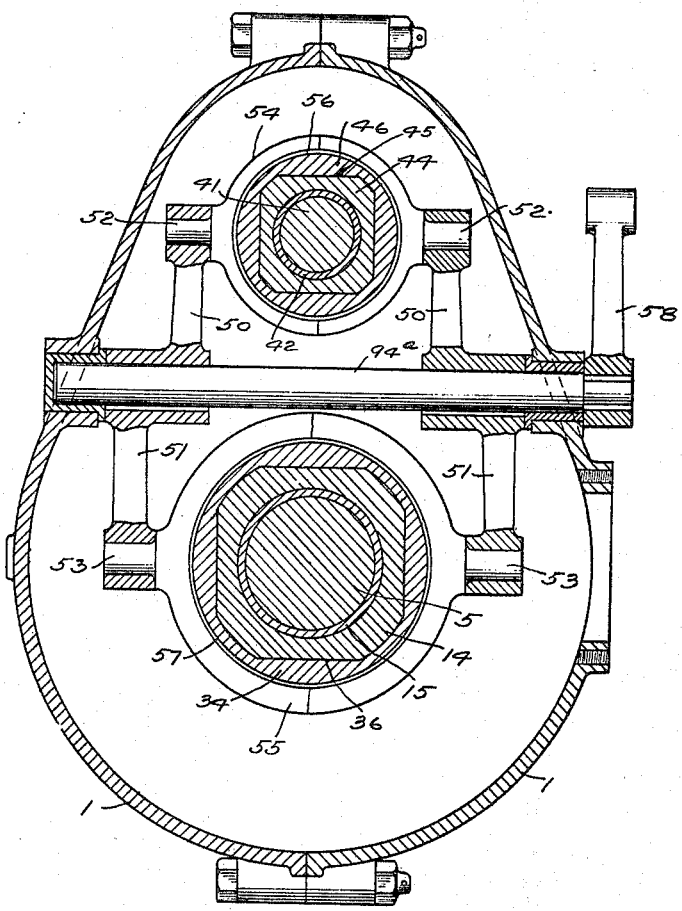

UNITED STATES PATENT OFFICE.

LELAND F. GOODSPEED, OF WILKINSBURG, PENNSYLVANIA.

POWER-TRANSMITTING MECHANISM.

1,168,494.  Specification of Letters Patent.  Patented Jan. 18, 1916.

Application filed March 2, 1908. Serial No. 418,732.

*To all whom it may concern:*

Be it known that I, LELAND F. GOODSPEED, a citizen of the United States, residing at Wilkinsburg, in the county of Allegheny and State of Pennsylvania, have invented new and useful Improvements in Power-Transmitting Mechanism, of which the following is a specification.

My invention relates to power transmission and clutch mechanism, and more particularly as employed in connection with motor or self-propelled vehicles.

One of the objects of my invention is to provide an improved mechanism of the above character having a simple and compact arrangement of parts, and so constructed that parts subject to wear or breakage may be readily removed and replaced at slight expense.

Another object of my invention is to provide an improved friction clutch mechanism for operatively connecting and disconnecting the power motor to and from the vehicle driving axle, and means whereby the pressure applied to the clutch may be varied at will as desired, so that the above mentioned connection and disconnection may be effected gradually, and thereby obviate the violent racking of engine and transmission gear parts and the consequent liability to damage and breakage.

In the accompanying drawings; Figure 1 is a diagrammatic view, illustrating one form of my improved transmission and speed changing mechanism with manual controlling means therefor, as applied to a motor car or self propelled vehicle; Fig. 2 a top plan view of a preferred construction of my transmission and speed gear mechanism, with the upper part of the casing removed; Fig. 3 a plan view similar to Fig. 2, showing the clutch and gear mechanism in section; Fig. 4 a transverse section taken substantially on the broken line *a—a* of Fig. 3; Fig. 5 a sectional view of the end portion of the main engine shaft, showing the arrangement for supplying the lubricant to the shaft; Fig. 6 a plan view of the seat for the rotary valve which controls the speed changing gear clutches; Fig. 7 a face view of the above rotary valve; Fig. 8 a plan view of the valve seat for the rotary valve which controls the transmission clutch, and Fig. 9 a face view of the rotary valve therefor.

According to a preferred construction, which is illustrated in the drawings, I provide a suitable casing, preferably made up of half sections 1, adapted to be bolted together, each section being provided with transverse bearings 2 for the vehicle driving shaft or axle 3 and a longitudinal bearing 4 for the main or power motor shaft 5, which is operatively connected to a suitable driving motor not shown.

The outer end of the main shaft 5 may be supported in a bearing box 25, which is secured to the half casing 1 by bolts 26. Intermediate the bearings 4 and 25 and on the shaft 5 is located the main transmission clutch 6 which comprises intercalated plates, the alternate plates 7 of which are provided with apertures adjacent the shaft 5, through which extend plate holding bolts 8. The bolts 8 are firmly secured to the main shaft 5, by providing a flanged portion on the shaft, having sockets therein, within which the bolt heads fit, and are held in position by a ring 9 fitting over the bolt heads and adapted to be tightly driven in place. An outer ring 10, provided with registering apertures for the bolts 8 and mounted on the shaft 5, serves to hold the outer ends of the bolts in position. The other friction plates 11 are provided with apertures located near the outer periphery of the plates for the holding bolts 12, which are firmly secured in a flange or disk 13, having an extended sleeve portion 14 rotatably mounted on the shaft 5 and preferably with a bearing liner or bushing 15 interposed between shaft and sleeve. Thus one set of plates 7 rotate with the shaft 5, while the alternated plates 11 and the driving sleeve 14 are set into motion whenever a sufficient frictional resistance is set up between the plates by applying pressure thereto.

I preferably make the friction plates of the clutch of cast iron, as this material affords a very desirable friction surface.

The pressure controlling means for the clutch comprises a plate 23, mounted on the bolts 12 adjacent the friction plates and having an outwardly extending cylindrical portion within which a pressure applying ring 19 is mounted.

The ring 19 is provided with lugs 94 on opposite sides of the shaft 5 and has pins 18, which engage slots in arms or levers 17, secured to an operating shaft 16. The shaft 16 extends outside of the casing 1 and is provided with a lever 20, operatively connected to a piston 21 of an air cylinder 22. By supplying fluid under pressure to the air cylinder 22, the piston 21 may be actuated and the pressure transmitted through the levers and shaft 16 to the pressure ring 19, which moves inwardly and presses the friction plates into engagement.

An anti-friction device may be interposed between the pressure ring 19 and the plate 23, so as to reduce the friction therebetween when in operation. The anti-friction device preferably comprises bearing rings 24 between which are mounted balls 26, retaining rings 27 being provided for holding the balls in place.

The driving axle or shaft 3 is actuated through a bevel gear 30, preferably constructed in half sections, secured to the shaft 3 and meshing with a bevel gear 31, similarly constructed and secured by bolts 32 to a gear 33 which is mounted on the shaft 5.

The sleeve 14 is provided with flat faces 36, and a slidable clutch block 34 is mounted thereon, as shown in Fig. 4. On the end of the clutch block 34 near its periphery are located a number of spaced recesses or sockets 35, which are adapted to engage with the projecting heads of the bolts 32 and thereby operatively connect the driving sleeve 14 with the bevel gearing and the driving axle 3. Thus the motor shaft may be connected through the friction plate clutch and driving sleeve 14 to the driving axle by operating the clutch block 34, to obtain a certain rotative speed of the driving axle. I also provide means for securing another rotative speed comprising a gear 37, secured by bolts 38 to the plate 13 and intermediate gears 39 and 40 for transmitting motion from the gear 37 to the gear 33. Gears 39 and 40 are mounted on a stationary shaft 41, the squared ends of which are mounted in alined bearings, bushings 42 and 43 being preferably interposed between the gears 39 and 40 respectively and the shaft 41.

The gear 39 has an extended sleeve portion 44 provided with flat faces 45, as shown in Fig. 4, and a clutch block 46 is slidingly mounted thereon. The block 46 is provided on the end portion with projections 48, and the adjacent end of the gear 40 with projections 49 for engaging counterpart recesses in the gear 40 and the clutch block 46 respectively. Thus by shifting the clutch block 46 the operative connection may be made from the gear 39 to the gear 40.

I preferably proportion the gearing so that the low speed is obtained through the above gearing while the high speed is obtained through the direct connection, since it is desirable to obviate the use of gears at the high speed as much as possible.

The clutch blocks 34 and 46, according to my invention, are controlled by one operating means so that the movement of one clutch block to operatively engage with its corresponding clutch element, causes the other clutch block to disengage, and thus prevent the concurrent engagement of both clutches. For this purpose I preferably provide rigidly connected rocker arms 51 and 50 on opposite sides of the clutch blocks 34 and 46 and mounted on an operating shaft 94ª. The outer ends of the arms 50 and 51 are provided with bearings for trunnions 52 and 53 of half rings 54 and 55, loosely mounted in grooves 56 and 57 in clutch blocks 46 and 34 respectively. Suitable bearings are provided in the casing sections 1 for the operating shaft 94ª, and on the outer end of the shaft an operating arm or lever 58 is secured. Said arm extends into an air cylinder 59 and is connected operatively to a piston 95 therein, as shown in Fig. 1.

Anti-friction thrust bearings 60 and 61, similar to those employed in connection with the transmission clutch, may be interposed between the gear 33 and clutch block 34, and the main shaft bearing 25 and the gear 33, respectively. A like bearing 62 may also be placed between the axle bearing 2 and the bevel gear 30.

An extended bushing 63 is secured to and turns with the gear 33, and a bushing 64 is interposed between the bushing 63 and the bearing 25, so that when running with the clutch block 34 in mesh, the gear 33, bushing 63 and shaft 5 all turn together in bushing 64 as a bearing, while with the clutch 46 in mesh, the shaft 5 turns within and relative to the bushing 63, and bushing 63 turns in the bushing 64.

A manually operated cock 66 is provided for controlling the fluid pressure in the air cylinder 22, to which it is connected by a pipe 67. In addition to the port opening of pipe 67 in the valve seat of the cock 66 an exhaust port 68 is provided and a supply port 69, connected to a source of supply and opening into the chamber above the rotary valve 96. The rotary valve 96 has a through port 70, adapted to register with port 67 for supplying air to the cylinder 22, and an exhaust cavity 71 adapted to connect the exhaust port 68 with port 67 in one position to release air from the cylinder 22. A cock 75 is also provided for controlling the fluid pressure in air cylinder 59, and for this purpose is provided with pipes 76 and 77 opening to the valve seat of the valve and leading to opposite ends of the air cylinder 59. The valve seat has a central exhaust port 78 and a supply port 79, which is connected to a source of fluid pressure and opens to the valve chamber above the rotary valve 80.

The rotary valve 80 is provided with an exhaust cavity having openings 82 and 83 and a central opening 97, adapted to register with the exhaust port 78. A through port 81 therein is located so as to connect one of the ports 76 or 77 with the fluid pressure supply when the other port is open to the exhaust through one of the ports 82 or 83. Thus one side of the piston 95 is subject to fluid pressure and the opposite side is open to the atmosphere according to the position of the valve 80.

In order to furnish air for the operation of the clutch mechanisms I may employ an air pump comprising an air cylinder 72, having a piston 73 operatively connected to the main shaft 5, and a storage reservoir 74 into which the air is compressed. Supply pipes 69 and 79 may be connected by suitable piping to the reservoir 74. By manipulation of the cock 75, either the clutch 34 or 46 is thrown into operative engagement as desired, and the other is thrown out as will be clearly understood, and by operating the cock 66 the fluid pressure may be varied as desired in the air cylinder 22 and the corresponding pressure being transmitted through the shaft 16 and arms 17 to the plate clutch, causes the frictional engagement of the alternately rotating and stationary plates of the clutch. The motion of the shaft 5 is thus gradually imparted to the driving plate 13, and thence, when the clutch 34 is in mesh, through the gear 33 and the bevel gears 31 and 30 to the axle 3. If the other clutch 46 is in mesh, then the power is transmitted through the gears 37 and 39 and gears 40 and 33 to the bevel gears 31 and 30, as will be apparent.

It will be seen that by varying the pressure in the air cylinder 22 any desired pressure may be applied to the plate clutch and the desired gradual starting of the vehicle is obtained, and the violent racking of the gearing and other mechanism is avoided.

Certain of the plates 11 of the clutch may be provided with enlarged apertures for the bolts 12 so that spiral springs 84 may be interposed to assist in forcing apart the friction plates when it is desired to disconnect the main shaft from the driving wheels, as shown in Fig. 3.

Another feature of my invention contemplates providing means for automatically lubricating the working parts of the mechanism, and for this purpose I provide a suitable oil pump 86 which may be operatively connected to the shaft 5 by the meshing gears 87 and 88. The oil from the pump 86 is forced through a pipe 89, which is tapped into the end of the stationary shaft 41, and flows through a central passage therein having radial passages 98, leading to longitudinal grooves, so as to lubricate the bearing bushings 42 and 43.

A pipe 90 is connected to the outer end of the central passage in the shaft 41 and leads to the usual oil groove of one bearing 2, a branch pipe 91 is connected to pipe 90 and leads to the oil groove of the other bearing 2. The branch pipe 91 is also connected to a passage 92 in the bearing box 25, which leads to a central passage 93 in the main shaft 5, as shown in detail in Fig. 5. The central passage 93 has radial passages as desired leading to the various bearing surfaces of the shaft and also radial passages 99, opening out at the inner peripheries of the friction plates 11 and 7, thus providing for thorough lubrication between the plates. The oil drains from the bearings and clutch down to the bottom of the lower casing section 1 whence it is taken up by the pump and again circulated through the system.

Having now described my invention, what I claim as new and desire to secure by Letters Patent is:—

In a power transmitting mechanism, the combination of a driving shaft having bearings, and a flange between said bearings, a driven sleeve rotatably mounted on said shaft and having a flange in the same plane with the flange on the shaft, a ring on said shaft, two sets of friction disks surrounding the shaft and located between said ring and the flanges, bolts connecting the shaft flange and ring and extending through apertures in one set of said friction disks, other bolts secured to the sleeve flange and extending through apertures in the other set of disks, a plate mounted on said sleeve flange bolts, and a pressure ring bearing against said plate.

In testimony whereof I have hereunto set my hand.

LELAND F. GOODSPEED.

Witnesses:
R. F. EMERY,
WM. M. CADY.